(12) United States Patent
Behrens et al.

(10) Patent No.: US 8,047,550 B2
(45) Date of Patent: Nov. 1, 2011

(54) TILE GAP SEAL ASSEMBLY AND METHOD

(75) Inventors: William W. Behrens, St. Louis, MO (US); Andrew R. Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 307 days.

(21) Appl. No.: 12/368,030

(22) Filed: Feb. 9, 2009

(65) Prior Publication Data

US 2010/0199583 A1   Aug. 12, 2010

(51) Int. Cl.
*F16J 15/02* (2006.01)
(52) U.S. Cl. ........ 277/630; 277/637; 277/641; 277/652; 277/645; 277/921; 49/489.1
(58) Field of Classification Search .................. 277/630, 277/637, 641, 652, 645, 921; 49/492.1, 489.1; 52/396.01, 402, 716.6
See application file for complete search history.

(56) References Cited

U.S. PATENT DOCUMENTS

| | | | | |
|---|---|---|---|---|
| 1,625,764 | A | * | 4/1927 | Bosley ........................... 112/417 |
| 1,883,609 | A | * | 10/1932 | Dennis ........................... 49/495.1 |
| 1,893,399 | A | * | 1/1933 | Clark ............................. 49/495.1 |
| 2,536,863 | A | * | 1/1951 | Widman ......................... 49/493.1 |
| 3,090,646 | A | * | 5/1963 | Johnson ..................... 296/107.11 |
| 3,292,330 | A | * | 12/1966 | Tennison .................... 52/396.09 |
| 3,353,832 | A | * | 11/1967 | Coulson ........................ 277/591 |
| 3,578,764 | A | * | 5/1971 | Nunnally et al. .................... 87/6 |
| 3,775,921 | A | * | 12/1973 | Avera .............................. 52/471 |
| 3,812,316 | A | * | 5/1974 | Milburn ......................... 219/741 |
| 4,081,647 | A | * | 3/1978 | Torrey ........................... 219/741 |
| 4,194,749 | A | * | 3/1980 | Bonafous ....................... 251/306 |
| 4,219,203 | A | * | 8/1980 | Lovelace et al. ............... 277/637 |
| 4,265,383 | A | * | 5/1981 | Ferguson ....................... 224/326 |
| 4,308,309 | A | | 12/1981 | Frosch et al. |
| 4,337,815 | A | * | 7/1982 | Lindstrom ..................... 160/392 |
| 4,344,591 | A | | 8/1982 | Jackson |
| 4,406,494 | A | * | 9/1983 | Uemura et al. ................ 296/214 |
| 4,415,170 | A | * | 11/1983 | Bonafous ....................... 251/306 |
| 4,441,726 | A | | 4/1984 | Uhl |
| 4,931,326 | A | * | 6/1990 | Weil .............................. 428/35.8 |
| 5,213,346 | A | * | 5/1993 | Thomson et al. .............. 277/315 |
| 5,545,273 | A | | 8/1996 | Rasky et al. |
| 5,737,991 | A | * | 4/1998 | Kite, III ............................. 87/9 |

(Continued)

OTHER PUBLICATIONS

National Aeronautics and Space Administration, NASA Facts, "Orbiter Thermal Protection System," Mar. 1997, FS-2000-06-29-KSC, available at <http://www-pao.ksc.nasa.gov/kscpao/nasafact/pdf/tps.pdf> last visited Jan. 21, 2011.

(Continued)

*Primary Examiner* — Alison Pickard

(57) ABSTRACT

A seal assembly is configured to seal a tile gap between a pair of tiles. Each of the tiles may include a tile side surface. At least one of the tiles may include a groove which may be formed along a length of the tile side surface. The seal assembly may comprise a gasket assembly including first and second bulb portions which may be interconnected by a web. A spacer rope may be positionable along the web. The gasket assembly may define a folded configuration for mounting within the tile gap when the web is wrapped around the spacer rope such that the second bulb portion is positioned between the spacer rope and the first bulb portion. The second bulb portion may be receivable within the groove.

25 Claims, 8 Drawing Sheets

U.S. PATENT DOCUMENTS

| | | | |
|---|---|---|---|
| 6,439,137 B1 * | 8/2002 | Groen et al. | 110/341 |
| 6,685,252 B2 * | 2/2004 | Graf et al. | 296/108 |
| 6,711,858 B1 * | 3/2004 | Albanese et al. | 49/475.1 |
| 6,974,109 B1 * | 12/2005 | Mezits et al. | 244/158.3 |
| 7,360,769 B2 * | 4/2008 | Bennett | 277/641 |
| 7,438,344 B2 * | 10/2008 | Williams et al. | 296/107.05 |
| 7,485,354 B2 * | 2/2009 | Bohner et al. | 428/60 |
| 7,845,649 B2 * | 12/2010 | Kowalczyk | 277/641 |
| 2011/0018213 A1 * | 1/2011 | Bunel | 277/645 |

OTHER PUBLICATIONS

Boeing Frontiers, "Analyze this; Boeing provides data, work to NASA for safe Space Shuttle re-entry," Oct. 2005, vol. 04, Issue 6, available at <http://www.boeing.com/news/frontiers/archive/2005/october/i_ids4.html> last visited Jan. 21, 2011.

Boeing—Integrated Defense Systems, "Return to Flight; Vehicle Upgrades: Gap Fillers, Boeing engineers assist NASA in Shuttle tile work," available at <www.boeing.com/news/releases/2006/q1/060125a_nr.html> last visited Jan. 21,2011.

Thermostatic Industries, Inc., "Tadpole Gaskets," available at <http://www.thermostatic.com/gaskets/doorseals.shtml> last visited Jan. 21, 2011.

National Aeronautics and Space Administration, NASA Facts,"Orbiter Thermal Protection System," Mar. 1997, FS-2000-06-29-KSC, available at <http://www-pao.ksc.nasa.gov/kscpao/nasafact/pdf/tps.pdf> last visited Jan. 25, 2009.

Boeing Frontiers, "Analyze this; Boeing provides data, work to NASA for safe Space Shuttle re-entry," Oct. 2005, vol. 04, Issue 6, available at <http://www.boeing.com/news/frontiers/archive/2005/october/i_ids4.html> last visited Feb. 9, 2009.

Boeing—Integrated Defense Systems, "Return to Flight; Vehicle Upgrades: Gap Fillers, Boeing engineers assist NASA in Shuttle tile work," available at <http://www.boeing.com/news/frontiers/archive/2005/october/i_ids4.html> last visited Feb. 9, 2009.

Thermostatic Industries, Inc., "Tadpole Gaskets," available at <http://www.thermostatic.com/gaskets/doorseals.shtml> last visited Feb. 9, 2009.

* cited by examiner

TILE GAP SEAL ASSEMBLY AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to thermal protection systems and, more particularly, to a seal assembly and method for sealing gaps between tiles.

BACKGROUND

Thermal protection systems are employed in a wide variety of applications including, but not limited to, interior surfaces of jet and rocket engines and exterior surfaces of vehicles for protection against hot, convective flow passing over the vehicle. For example, a thermal protection system (TPS) may be applied to hypersonic vehicles and reusable launch vehicles to provide a thermal shield against extreme temperatures to which the vehicle is subjected. As applied to reusable launch vehicles, a TPS must be capable of protecting the vehicle substructure against temperature extremes ranging from −300° F. on orbit to 3000° F. during re-entry into the Earth's atmosphere. In this regard, a TPS must be capable of maintaining the temperature of the vehicle's metallic and/or composite substructure below the temperatures at which the mechanical properties of the substructure begin to degrade.

As applied to vehicles such as the Space Shuttle, a TPS may comprise a large number of insulative elements that may be mounted on the substructure for protection against high-temperature convective flow. For example, the TPS may comprise a plurality of ceramic foam tiles which may be configured as passive thermal tiles or as actively-cooled tiles. Actively-cooled tiles may include channels through which coolant may be circulated in order to draw excess heat from the tiles and/or substructure.

In addition to protecting substructure against temperature extremes, a TPS must also accommodate relative movement of the substructure under static and dynamic loading conditions. For example, a TPS must be capable of accommodating flight-induced deflections of a vehicle substructure. Tile gaps may be provided between tiles in order to accommodate such relative movement of the substructure. In addition, tile gaps may be provided between tiles to accommodate differences in the thermal expansion properties of the tiles relative to the thermal expansion properties of the substructure to which the tiles are mounted. For example, during orbital maneuvers of a reusable launch vehicle, temperatures can vary by several hundred degrees Fahrenheit causing differences in thermal expansion of the tiles relative to the airframe substructure. The tile gaps must be sized in order to accommodate such differences in thermal growth.

However, tile gaps must also be sealed to minimize heating of the substructure at the bottom of the tile gap by high temperature convective flow passing over the tile exterior surfaces. In addition, it is desirable to seal the tile gaps in order to maintain the aerodynamics or continuity of flow over the tile exterior surfaces which may comprise an outer mold line of a vehicle. In this regard, the tile gaps must be sealed to minimize aerodynamic pressure losses otherwise associated with open tile gaps. Due to the relatively large number of thermal tiles employed in a given application (e.g., tens of thousands on a single Space Shuttle), it is desirable that seals for the tile gaps are relatively easy to install and are securely maintained in position within the tile gap to prevent extraction by high speed flow passing over the tile exterior surfaces.

Included in the prior art are several seal assembly configurations for sealing tile gaps. One prior art configuration comprises thermal padding or filler bar which may be force-fitted into the tile gaps. Following force-fitting into the tile gaps, the thermal padding or filler bar may be coated with a high-temperature hardening compound to provide a smooth surface over the tile gap that is continuous with the tile exterior surfaces. Another prior art seal assembly configuration includes the use of adhesives for bonding insulating materials to tile side surfaces of opposing thermal tiles.

Another prior art sealing assembly configuration includes the use of flaps that are mechanically secured in position by sandwiching the flaps between the thermal tiles and the substructure. A further prior art configuration includes the use of an insulating material which is clamped in position beneath a bracket mounted to the substructure. The insulating material forms a liner on the opposing tile side surfaces and extends upwardly to the tile exterior surface in order to maintain continuity of the outer mold line across the tile gap.

While the above described prior art sealing assembly configurations are generally suitable for their intended purposes, they possess several drawbacks which detract from their overall utility. For example, the hardening compound that is applied over filler bar complicates removal, repair and/or replacement of the tiles. Likewise, seal assemblies which are adhesively bonded within the tile gaps present difficulties in repairing and/or replacing the seal assembly or the tiles to which the seal assembly is bonded. Seal assemblies such as the above-mentioned flaps which are mechanically attached to the tile gaps by sandwiching between the tile and substructure may be costly to manufacture and time-consuming to install.

As can be seen, there exists a need in the art for a seal assembly for sealing tile gaps between tiles which forms a low-thermal conductivity seal to prevent overheating of the underlying substructure. Additionally, there exists a need in the art for a seal assembly which maintains continuity of the outer mold line of the tile exterior surfaces while accommodating differences in thermal expansion of the tiles relative to the substructure. Furthermore, there exists a need in the art for a seal assembly which obviates the need for adhesive bonding or mechanical attachment of the seal assembly to the tile. Finally, there exists a need in the art for a seal assembly for sealing tile gaps which is simple in construction, low in cost and which is easily insertable into the tile gap and securely maintainable in position but which is also easily removable and replaceable in the field.

BRIEF SUMMARY

The above-noted needs associated with seal assemblies of the prior art are specifically addressed and alleviated by the present disclosure which provides a seal assembly for sealing a tile gap between a pair of tiles or between other structural elements. The seal assembly comprises a gasket assembly which may include first and second bulb portions that may be interconnected by a web. The seal assembly may further comprise a spacer rope which may be positionable along the web. The gasket assembly may define a folded configuration for mounting within the tile gap when the web at least partially encircles or is wrapped around at least a portion of the spacer rope such that the second bulb portion is positioned between the spacer rope and the first bulb portion. At least one of the tiles may include a tile side surface with a groove formed along a length thereof. The second bulb portion may be receivable within the groove in order to lock the seal assembly within the tile gap without the need for adhesive bonding, mechanical attachment or other external means for securing the seal assembly within the tile gap.

The gasket assembly may be formed of high-temperature materials that may be flexible but resiliently resistant to bending in order to create a spring mechanism when the seal assembly is in the folded configuration such that the second bulb portion is biased into the groove to lock the seal assembly into position within the tile gap. When installed within the tile gap, the first bulb portion may be positioned proximate the tile exterior surface and may be sized and configured to maintain sealing engagement with the opposing tile side surfaces to form a first seal within the tile gap.

The second bulb portion in combination with the spacer rope may be placed in sealing engagement with the tile gap to form a second seal that is redundant to the first seal for enhanced thermal protection of the substructure at the base of the tile gap. In this regard, the tile gap may be at least partially bounded by a substructure surface of the substructure. Furthermore, the seal assembly may be configured to be mounted within the tile gap in spaced relation to the substructure surface in order to form an inner gap between the seal assembly and the substructure. In this manner, the combination of the first and second seals and the inner gap advantageously provide thermal protection to the substructure such as against hot convective flow passing along the tile exterior surface (i.e., outer mold line). The first and second bulb portions, web and spacer rope are preferably fabricated of materials having low thermal conductivity to minimize heat transfer to the substructure.

The technical effects of the disclosure include an improvement in thermal sealing of tile gaps in high temperature operating environments by forming redundant first and second seals in combination with the inner gap for improved thermal protection of the underlying substructure. The seal assembly may be applicable for use in any application or environment including, but not limited to, use on exterior surfaces of vehicles such as air and space vehicles as well as on interior surfaces of engines such as in combustion chambers of jet and rocket engines or in other high-heat environments. Furthermore, the seal assembly as disclosed herein is not limited to use in vehicular or engine applications but may be applied to any system, subsystem, application, building, structure, assembly or subassembly wherein sealing of gaps is desired. Even further, the seal assembly as disclosed herein is not limited to sealing tile gaps between thermal tiles. In this regard, the term "tile gaps" as used herein may include gaps formed within or between any structure, component, mechanism, system, application, building, vehicle, object or other arrangement. Likewise, the term "tile side surfaces" which form the tile gap is not limited to side surfaces of thermal tiles but may encompass side surfaces of any structure, mechanism, object, vehicle or component.

Advantageously, the seal assembly as disclosed herein eliminates the need for structural fastening or bonding of the seal assembly to the substructure and/or to the tiles. The seal assembly may be installed within the tile gap in a simple operation by inserting the seal assembly into the tile gap in a folded configuration. Field removal of the seal assembly may be easily effectuated in order to repair a damaged seal assembly or for inspection, maintenance or replacement of tiles and/or substructure.

The gasket assembly may be provided in an open configuration wherein the web interconnecting the first and second bulb portions has a generally planar or unfolded shape although it is contemplated that the gasket assembly may be provided in a partially folded or pre-formed configuration. The spacer rope may be positioned between the first and second bulb portions when the gasket assembly is in the open configuration. The seal assembly is configured such that the gasket assembly may be movable from the open configuration to the folded configuration as may be desired for mounting the seal assembly within the tile gap.

The web may be formed of material that is flexible, yet resiliently resistant to bending or wrapping around the spacer rope such that the combination of the web and spacer rope provides a biasing force for pushing or biasing the second bulb portion into the groove when the seal assembly is installed within the tile gap. In this regard, the web preferably has a stiffness that facilitates generation of the biasing force when the seal assembly is in the folded configuration. In this manner, the second bulb portion may be locked into the groove under the biasing force of the web to prevent extraction of the seal assembly from the tile gap under forces such as aerodynamic forces which may otherwise draw the seal assembly out of the tile gap.

In an embodiment, the gasket assembly may be formed of double bulb tadpole gasket such as commercially-available double bulb tadpole gasket wherein each one of the first and second bulb portions may be formed of a bulb core surrounded by a bulb jacket. The bulb jacket may be co-extensive or continuous with the web that interconnects the first and second bulb portions. Each one of the first and second bulb portions may be configured to be resiliently compressible for sealing engagement with the tile side surfaces. The bulb core and bulb jacket are preferably formed of materials having low thermal conductivity and are preferably configured to maintain compressive sealing engagement with the tile gap at elevated temperatures.

In an embodiment of the seal assembly, the bulb jacket and the web may be formed of woven material such as ceramic material including, but not limited to, a ceramic composition such as ceramic material that is available from the 3M Company and which is commercially-known as Nextel 312 having an alumina-boria-silica composition. However, the bulb jacket and the web may be formed of any material including metallic or nonmetallic materials or combinations thereof in woven or non-woven form. The material for forming the bulb jacket and/or web core may provide compressive resiliency at any temperature including elevated temperatures.

The bulb core may likewise be fabricated of a material having low thermal conductivity and which is also compressively resilient in order to provide sealing engagement of the first and second bulb portions within the tile gap. In an embodiment, at least one of the first and second bulb portions may include a bulb core formed of a ceramic composition such as alumina-silica. However, the bulb cores may be fabricated of any suitable material providing compressive resiliency and which may have a suitably low thermal conductivity. Likewise, the spacer rope may be formed of any material such as woven material having high resistance to temperature. In an embodiment of the seal assembly, the spacer rope may be fabricated of a ceramic material such as silica although any suitable material may be used for fabricating the spacer rope.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
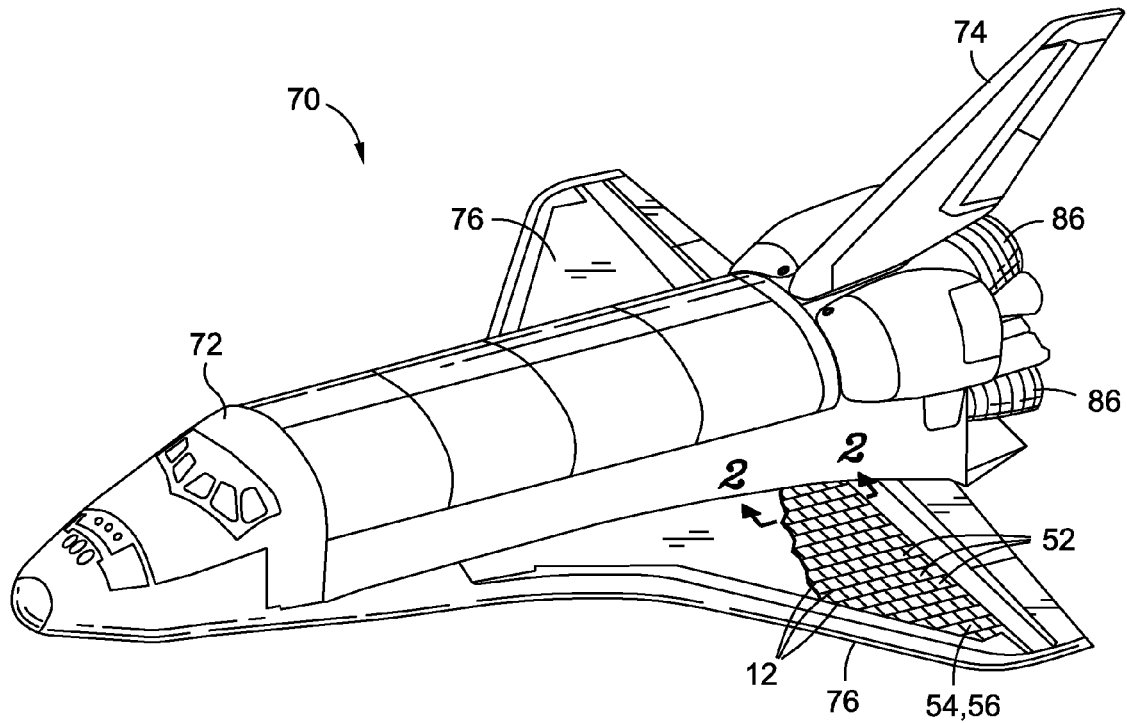
FIG. 1 is a perspective illustration of a vehicle having a plurality of tiles mounted on a substructure of a vehicle and which may include a corresponding plurality of tile gaps which may be sealed by the sealing assembly disclosed herein.

Referring now to the drawings wherein the showings are for purposes of illustrating preferred and various embodiments of the disclosure only and not for purposes of limiting the same, shown in FIG. 1 is a perspective illustration of a vehicle 70 which may employ one or more seal assemblies 12 for sealing tile gaps 60 between adjacently disposed tiles 52. The seal assembly 12 as disclosed herein may be installed within tile gaps 60 of tiles 52 mounted on a substructure 78 such as an airframe substructure 78 of the vehicle 70 illustrated in FIG. 1.

However, the seal assembly 12 may be installed within tile gaps 60 of tiles 52 that may be used in any application including, but not limited to, external surfaces of vehicles, internal surfaces of engines such as combustion chambers and nozzles in turbine and ramjet engines and nozzles in rocket engines as well as other high temperature environments. In this regard, the seal assembly 12 may be installed within tile gaps 60 of tiles 52 employed in any operating environment wherein thermal protection of underlying substructure 78 is desirable. The seal assembly 12 may be adapted for sealing tile gaps 60 of tiles 52 that may be configured as passive thermal tiles 52, as actively-cooled tiles 52 or in other tile configurations. For example, the tiles 52 may be formed as actively-cooled ceramic foam tiles 52 having channels 66 through which coolant may be circulated in order to maintain a temperature of the tile 52 and/or substructure 78 within operating limits.

In a broad sense, the seal assembly 12 comprises a gasket assembly 20 including first and second bulb portions 30, 32 which may be interconnected by a web 42. The seal assembly 12 may further include a spacer rope 40 which may be positionable along the web 42 such as in parallel alignment with the first and/or second bulb portions 30, 32. The gasket assembly 20 may be formed or positioned in a folded configuration 24 for installation or mounting within the tile gap 60 such that the web 42 at least partially encircles or wraps around the spacer rope 40. In the folded configuration 24, the second bulb portion 32 may be positioned between the spacer rope 40 and the first bulb portion 30 as shown in the FIG. 7.

Figure 7:
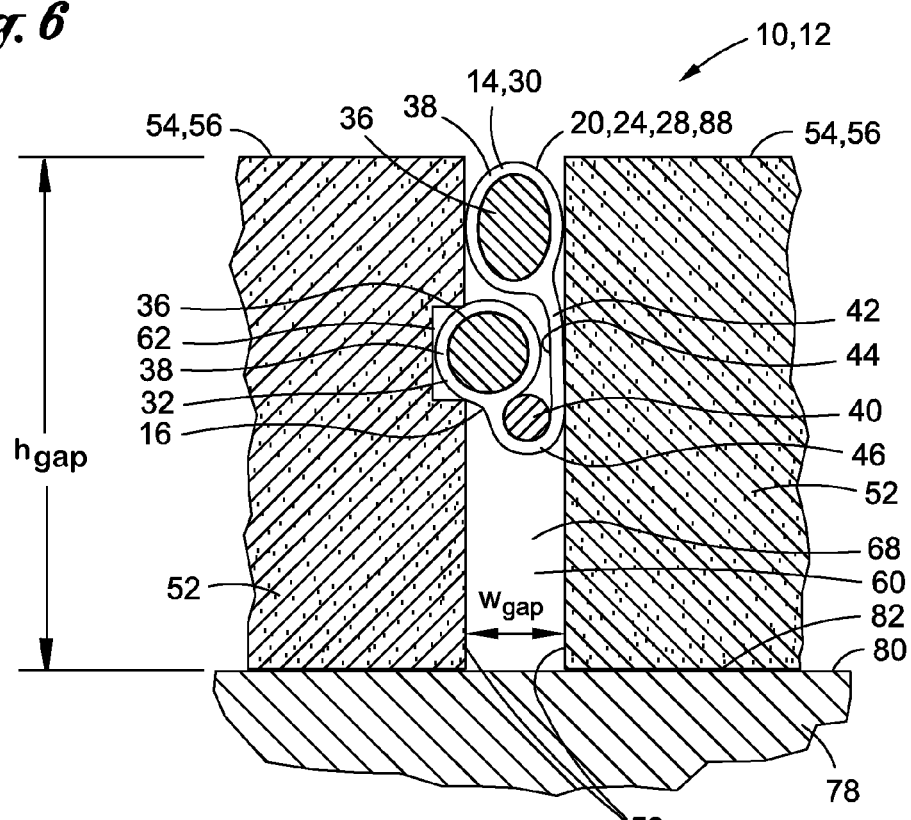
FIG. 7 is a cross-sectional illustration of the gasket assembly installed within the tile gap and illustrating the second bulb portion received within a groove formed within a tile side surface.

Referring briefly to FIG. 7, the seal assembly 12 may form a sealing system 10 with the tile gap 60 wherein at least one of the tiles 52 has a groove 62 formed along a length of one of a pair of opposing tile side surface 58. The groove 62 is preferably sized and configured such that the second bulb portion 32 may be at least partially receivable within the groove 62 in order to retain the seal assembly 12 in position within the tile gap 60 against forces which may tend to urge or draw the seal assembly 12 outwardly from the tile gap 60. The web 42 may be formed of a material that is flexible yet resiliently resistant to bending and therefore resiliently resistant to wrapping around the spacer rope 40 such that when the gasket assembly 20 is in the folded configuration 24 and the seal assembly 12 is installed within the tile gap 60, the gasket assembly 20 in combination with the spacer rope 40 creates a spring seal or spring mechanism 88 which biases or forces the second bulb portion 32 into the groove 62 in order to lock the seal assembly 12 in position within the tile gap 60.

In addition, the seal assembly 12 may be installed within the tile gaps 60 such that the first bulb portion 30 is positionable in sealing engagement with the tile side surfaces 58 to form a first seal 14 within the tile gap 60. The seal assembly 12 is configured such that the second bulb portion 32 in combination with the spacer rope 40 is positionable in sealing engagement within the tile gap 60 to form a second seal 16 therewithin. The first seal 14 and second seal 16 provide redundant thermal protection to underlying substructure 78 within the tile gap 60. Depending upon the temperature limits of the substructure 78, the seal assembly 12 may optionally be configured such that the gasket assembly 20 is positioned in spaced relation to the substructure surface 80 such that an inner gap 68 is formed between the seal assembly 12 and the substructure surface 80 when the seal assembly 12 is mounted within the tile gap 60. The inner gap 68 prevents the conduction of heat through the seal assembly 12 and into the substructure surface 80.

Referring to FIG. 1, shown is the vehicle 70 to which one or more seal assemblies 12 may be installed. The vehicle 70 may include a fuselage 72 having one or more wings 76 extending outwardly therefrom and including a tail section 74. Although illustrated as a reusable launch vehicle 70 (i.e., Space Shuttle), the vehicle 70 to which the seal assembly 12 may be applied may include any vehicle including marine, land, air or space vehicles such as, without limitation, space re-entry vehicles, hypersonic vehicles and any other manned or unmanned vehicle. Furthermore, the seal assembly 12 may be employed in non-vehicular applications including, but not limited to, any system, building, assembly, subassembly, or arrangement wherein tiles 52 may be mounted to form tile gaps 60.

For example, the seal assembly 12 may be applied to tile gaps 60 between thermal tiles 52 which may be mounted on substructure 78 of a combustion chamber of a turbine engine or a ramjet engine. The seal assembly 12 may be employed in other high temperature operating environments such as in nozzles of turbine engines or rocket engines or in any other areas located downstream of the engine exhaust wherein thermal protection of underlying substructure 78 is required. Even further, the seal assembly 12 as disclosed herein may be employed in applications other than with thermal tiles 52. In this regard, the seal assembly 12 may be mounted in any location wherein sealing of a gap between adjacently disposed objects is desirable without the use of adhesive bonding, mechanical attachment or other external means.

Figure 2:
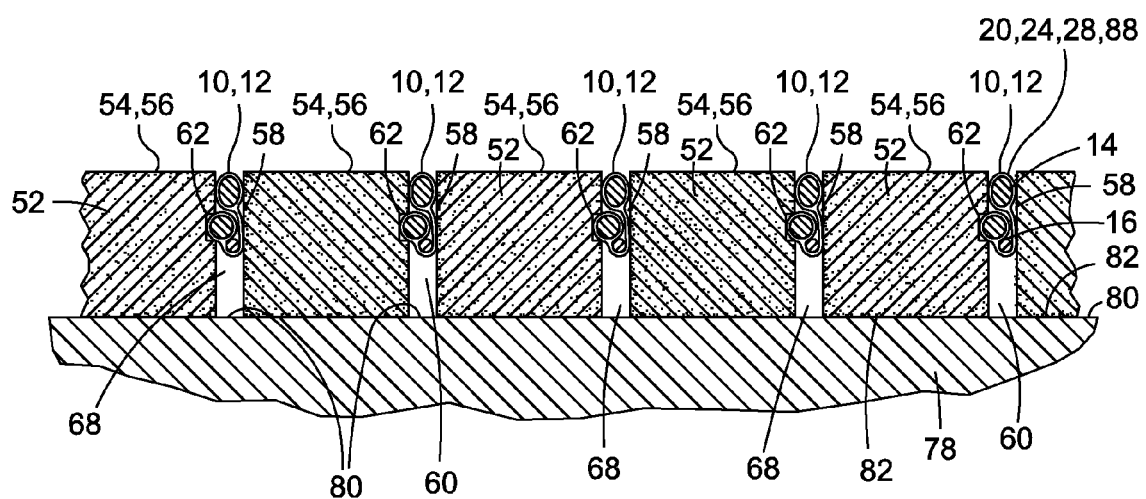
FIG. 2 is a cross-sectional view of the vehicle of FIG. 1 taken along line 2-2 and illustrating the installation of seal assemblies within the tile gaps.
Figure 6:
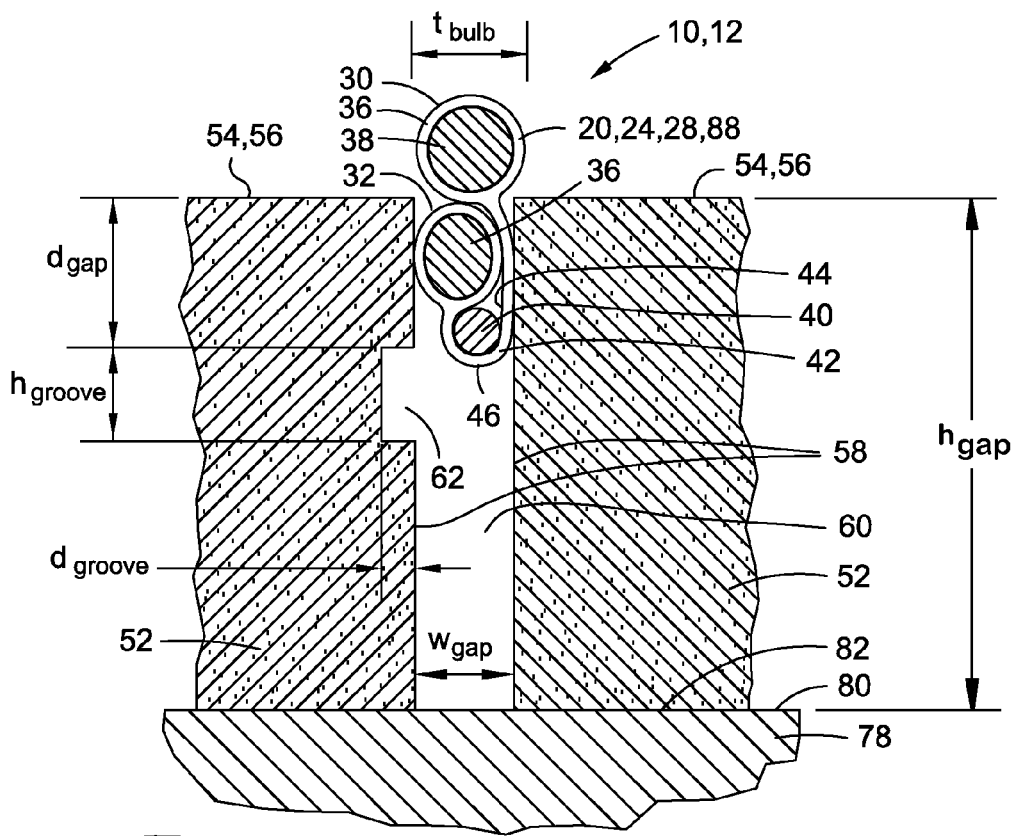
FIG. 6 is a cross-sectional illustration of the seal assembly during initial installation within the tile gap wherein the gasket assembly is in the folded configuration such that the web at least partially encircles the spacer rope and such that the second bulb portion may be positioned between the spacer rope and the first bulb portion.

Referring to FIG. 2, shown is a cross-sectional illustration taken along line 2-2 of FIG. 1 and illustrating a plurality of tiles 52 disposed in spaced relation to one another. In FIG. 2, the tiles 52 may be mounted on an airframe substructure 78 such as along the exterior surface of the wing 76 of the reusable launch vehicle. The seal assembly 12 seals the tile gaps 60 between the tiles 52 to protect the substructure 78 from radiative, convective and/or conductive heat. The tiles 52 may be mounted to the substructure 78 in any suitable manner such as by mechanical attachment and/or adhesive bonding. For example, as shown in FIGS. 6-7, adhesive 82 may be installed at the interface between the tile 52 and the substructure 78 and may comprise, for example, a room temperature vulcanizing (RTV) adhesive 82 although any other suitable adhesive 82 and/or mechanical attachment means may be employed to mount the tiles 52.

The tiles 52 may be disposed in spaced relation to one another in order to form the tile gaps 60. Each one of the tile gaps 60 may include the seal assembly 12 comprising the gasket assembly 20 and at least one spacer rope 40. When the gasket assembly 20 is placed in the folded configuration 24 as illustrated in FIG. 2, the web 42 may at least partially encircle or wrap around the spacer rope 40 such that the second bulb portion 32 is positioned between the first bulb portion 30 and the spacer rope 40. The second bulb portion 32 may be received within the groove 62 which may be formed in at least one of the opposing tile side surfaces 58 of an adjacent pair of tiles 52. The web 42 may be formed of a suitable material which is flexible and resiliently resistant to bending and therefore resistant to wrapping around the spacer rope 40 such that when wrapped around the spacer rope, the gasket assembly 20 and spacer rope 40 form the spring mechanism 88.

As can be seen in FIGS. 2 and 7, the second bulb portion 32 may be pushed or biased into the groove 62 under the biasing influence of the spring mechanism of the web 42 such that the seal assembly 12 is locked into position in the tile gap 60. The groove 62 may be positioned at a predetermined distance $d_{gap}$ from a tile exterior surface 56 of the tile 52 which may comprise the outer mold line 54 of a vehicle, object or structure or the inner mold line 54 of a vehicle propulsion system. The groove 62 may be positioned such that the first bulb portion 30 is located proximate to and/or in substantially flush relationship with the tile exterior surface 56 of at least one of the tiles 52 to provide continuity of the tile exterior surface 56 (e.g., outer or inner mold line 54) across the tile gap 60. By configuring the seal assembly 12 and the groove 62 such that the first bulb portion 30 is disposed in substantially flush relationship with the tile exterior surface 56, the aerodynamics of the outer or inner mold line 54 may be preserved thereby reducing pressure losses in the flow passing across the tile gap 60.

The first bulb portion 30 may form a seal between each of the tile side surfaces 58 to create the first seal 14 within the tile gap 60 to protect the underlying substructure 78 from hot, convective flow passing along the tile exterior surfaces 56. The positioning of the groove 62 relative to the tile exterior surface 56 as well as the size, shape and geometry of the groove 62 and of the seal assembly 12 may be such that the inner gap 68 is formed between the seal assembly 12 and the substructure 78 when the seal assembly 12 is mounted within the tile gap 60.

Referring still to FIGS. 2 and 7, the seal assembly 12 may be configured such that the first bulb portion 30 is placed between the tile side surfaces 58 to form the first seal 14 when the gasket assembly 20 is in the tile gap 60. The seal assembly 12 provides redundancy in thermal protection by providing the second seal 16 comprising the second bulb portion 32 and the spacer rope 40 located between the tile side surfaces 58 within the tile gap 60. The redundant seal 16 makes it very unlikely that hot gas can reach the substructure 78. The seal assembly 12 is resistant to being pulled out of the tile gap 60 due to the location of the spacer rope 40 below the second bulb portion 32.

As can be seen in FIG. 7, the spacer rope 40 is disposed to the side of and below the second bulb portion 32 and opposite of groove 62. The second bulb portion 32 and spacer rope 40 are sized and configured such that the spacer rope 40 is prevented from moving between the tile side surface 58 and the second bulb portion 32 upwardly toward the tile exterior surfaces 56. In this regard, movement of the spacer rope 40 toward the tile exterior surface 56 results in the second bulb portion 32 being pressured into the groove 62 and the spacer rope 40 pressing more tightly against the tile side surface 58. Likewise, downward movement of the first bulb portion 30 is blocked by the second bulb portion 32 which is locked in position within the groove 62. In this manner, the seal assembly 12 is configured such that the second bulb portion 32 and the groove 62 cooperate to prevent vertical (i.e., upward or downward) movement of the seal assembly 12 within the tile gap 60.

As was earlier indicated, the second bulb portion 32 is pressed against the groove 62 by means of the spring mechanism 88 of the web 42 which results in pressing the second bulb portion 32 into the groove 62 and thus away from the opposing tile side surface 58 as shown in FIG. 7. In this regard, the groove 62 may be provided in a shape that is complementary to the second bulb portion 32. The groove 62 may define a groove height $h_{groove}$ and a groove depth $d_{groove}$ and may be formed in any cross-sectional shape other than the rectangular shape shown in FIGS. 6 and 7. For example, it is contemplated that the groove 62 may be formed in a curved shape such as a semi-circular shape which is sized complementary to an outer bulb diameter $\varnothing_{bulb}$ of the second bulb portion 32.

Figure 3:
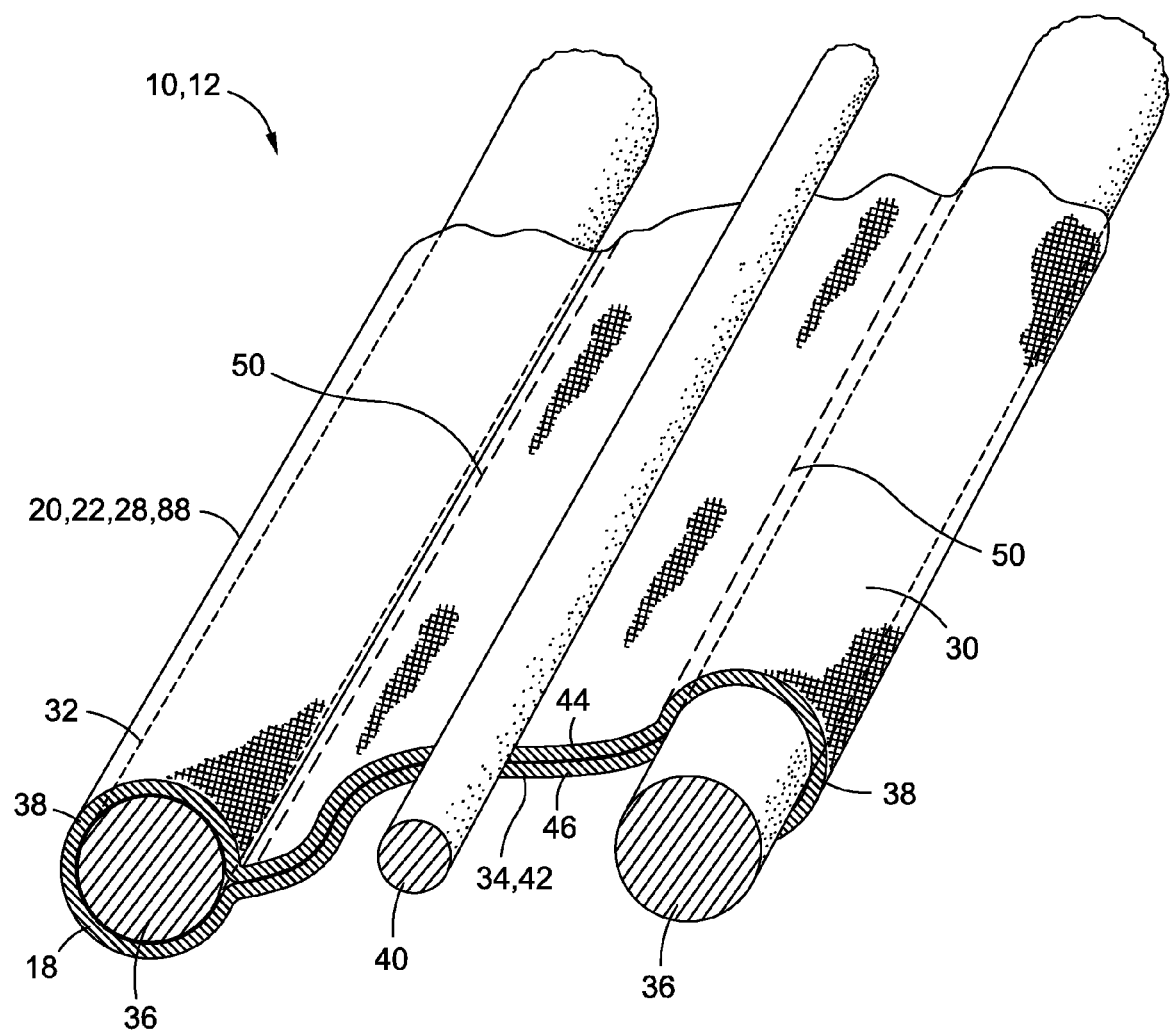
FIG. 3 is a perspective illustration of the seal assembly in an embodiment comprising a gasket assembly in an open configuration and formed as a double bulb tadpole gasket having first and second bulb portions interconnected by a web and further including a spacer rope positioned along the web.
Figure 4:
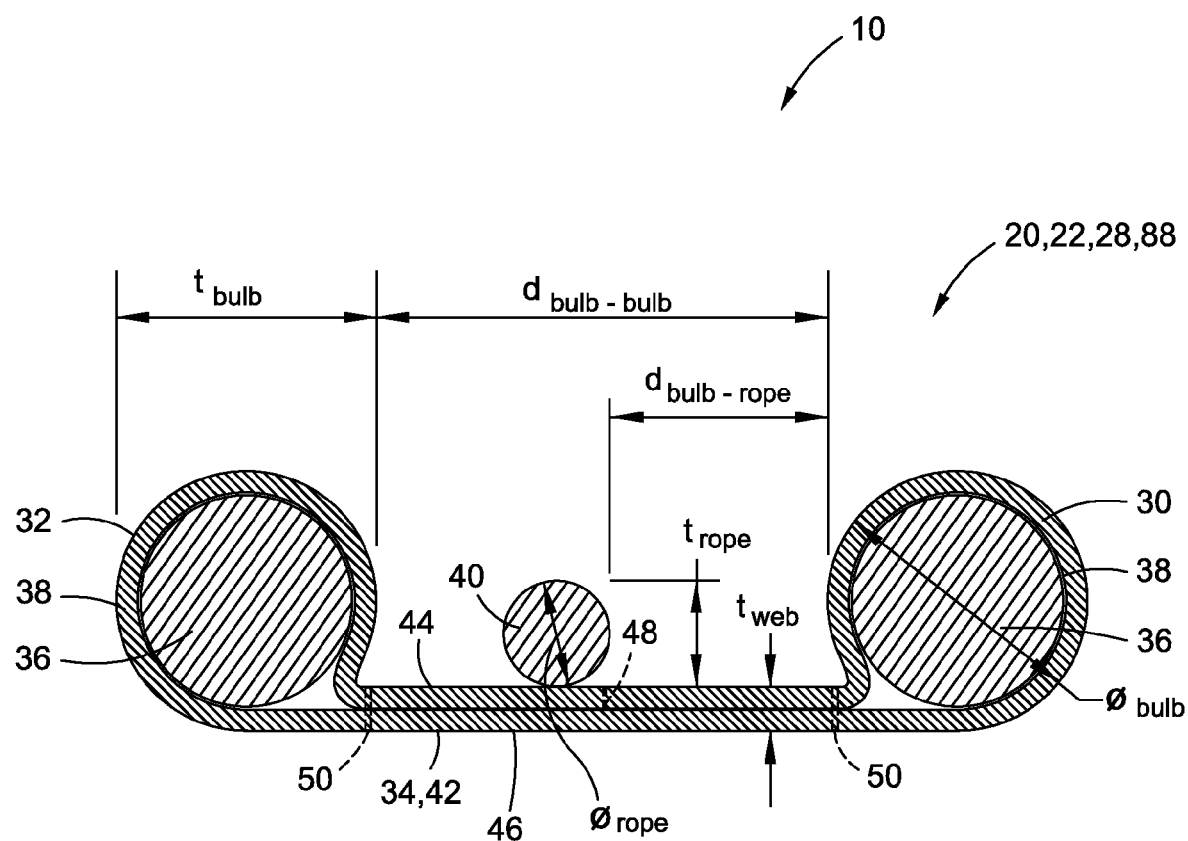
FIG. 4 is a cross-sectional illustration of the gasket assembly similar to that which is shown in FIG. 3 and further illustrating the positioning of the spacer rope relative to the first and second bulb portions.

Referring to FIGS. 3 and 4, shown is the seal assembly 12 in an arrangement wherein the gasket assembly 20 is comprised of a double bulb tadpole gasket 28 configuration which is commercially available and which comprises the first and second bulb portions 30, 32 interconnected by the web 42. In the arrangement shown, each one of the first and second bulb portions 30, 32 of the gasket assembly 20 may be formed of a bulb core 36 which may be at least partially covered or encased by a bulb jacket 38. The bulb jacket 38 may be co-extensive with or a continuation of the web 42 as illustrated in FIG. 4. However, it is contemplated that the bulb jacket 38 of each of the first and second bulb portions 30, 32 may be formed as separate components (not shown) from the web 42 but which may be joined by a suitable method along a length of web side edges 48 of the web 42 such as by gluing or mechanical fastening.

Furthermore, it is contemplated that least one of the first and second bulb portions 30, 32 may be fabricated as a homogenous member as opposed to each bulb portion 30, 32 being formed as a bulb core 36 covered by a bulb jacket 38. However, fabrication of the gasket assembly 20 using commercial available double bulb tadpole gasket 28 as shown in FIGS. 3 and 4 facilitates fabrication of the seal assembly 12 in a cost-effective manner. As can be seen in FIGS. 3-4, the web 42 interconnects the first and second bulb portions 30, 32 and also serves as the bulb jacket 38 for the bulb cores 36 of each one of the first and second bulb portions 30, 32. The gasket assembly 20 may be provided in any length such that the seal assembly 12 may be installed as a single, continuous member between a plurality of tiles 52 or as a plurality of seal assemblies 12 having seal ends 18 that are joined or abutted end-to-end. Although the first and second bulb portions 30, 32 are illustrated as being cylindrical in shape, it is contemplated that the first and second bulb portions 30, 32 may be provided in any cross-sectional shape including, but not limited to, square, rectangular, hexagonal, triangular or any other suitable shape that facilitates sealing within the tile gap 60.

Referring to FIGS. 3-4 and 6-7, the first and second bulb portions 30, 32 are preferably configured to be resiliently compressible such that when the seal assembly 12 is inserted into the tile gap 60 as shown in FIGS. 6 and 7, the first bulb portion 30 is compressible between the tile side surfaces 58. In this regard, at least one of the first and second bulb portions 30, 32 may be sized to provide an interference fit with the tile side surfaces 58 when the seal assembly 12 is installed within the tile gap 60. Furthermore, each one of the first and second bulb portions 30, 32 may define a bulb diameter $\varnothing_{bulb}$. The bulb diameter $\varnothing_{bulb}$ of the first and second bulb portions 30, 32 may be of generally equal size although the gasket assembly 20 may be provided in an arrangement wherein the first and second bulb portions 30, 32 are of unequal size. For example, the first bulb portion 30 may be provided with a bulb diameter $\varnothing_{bulb}$ that is larger than the bulb diameter $\varnothing_{bulb}$ of the second bulb portion 32 to facilitate engagement of the second bulb portion 32 within the groove 62. Additionally, it is also contemplated that the second bulb portion 32 may be of a slightly smaller diameter than the first bulb portion 30 due to the different mechanism by which the second bulb portion 32 forms the second seal 16 as shown in FIG. 7.

Furthermore, for configurations of the gasket assembly 20 wherein the first and second bulb portions 30, 32 are provided in non-cylindrical shapes, the first and second bulb portions 30, 32 may be provided with a bulb thickness $t_{bulb}$ as illustrated in FIGS. 4 and 6 to facilitate sealing engagement of the first and second bulb portions 30, 32 within the tile gap 60. As shown in FIG. 6, the first bulb portion 30 may have a bulb thickness $t_{bulb}$ which may be slightly larger than the width $w_{gap}$ of the tile gap 60 such that an interference fit is provided between the first bulb portion 30 and the tile gap 60 when the seal assembly 12 is installed in the tile gap 60. Regardless of their particular geometries, the first and second bulb portions 30, 32 are preferably configured in a suitable cross-sectional shape with appropriate compressive resiliency to form the first and second seals 14, 16.

Referring to FIG. 4, the gasket assembly 20 may be configured such that the first and second bulb portions 30, 32 may be spaced apart to an extent that when the gasket assembly 20 is in the open configuration 22, the web 42 may be folded or wrapped around the spacer rope 40 and the second bulb portion 32 may be received between the spacer rope 40 and the first bulb portion 30 as indicated by distance $d_{bulb-rope}$ in FIG. 4. Likewise, the spacer rope 40 may be configured to have a rope diameter $\varnothing_{rope}$ and/or a rope thickness $t_{rope}$ which facilitates wrapping or folding the web 42 at least partially around the spacer rope 40 such that the second bulb portion 32 may be positioned between the first bulb portion 30 and the spacer rope 40. Toward this end, the spacer rope 40 is also preferably positioned toward the second bulb portion 32 when the gasket assembly 20 is in the open configuration 22 as shown in FIGS. 3 and 4. By positioning the spacer rope 40 toward the second bulb portion 32 when the gasket assembly 20 is in the open configuration 22, the second bulb portion 32 may be received within the spacing $d_{bulb-rope}$ between the first bulb portion 30 and the spacer rope 40 as shown in FIGS. 6 and 7 and which may facilitate insertion of the seal assembly 12 within the tile gap 60.

The seal assembly 12 may also be configured such that the first bulb portion 30 may be folded or wrapped around the spacer rope 40 and may be received between the second bulb portion 32 and the spacer rope 40. Referring still to FIGS. 3 and 4, the spacer rope 40 may be positioned closer to the second bulb portion 32 than to the first bulb portion 30. The spacer rope 40 may be positioned along a web interior surface 44 of the web 42 as illustrated in FIGS. 3 and 4 such that when the gasket assembly 20 is in the folded configuration 24 in the tile gap 60, the web exterior surface 46 is in contacting relationship with at least one of the tile side surfaces 58 as shown in FIG. 7 to form the second seal 16 with the tile side surfaces 58.

As shown in FIGS. 3-4, the web 42 may be comprised of overlapping layers of web 42 material and which may also encircle or cover the bulb cores 36 of the first and second bulb portions 30, 32 to form the bulb jackets 38. The opposing web side edges 48 may be provided in a selvage configuration to prevent fraying of the web 42. The web side edges 48 of the web 42 may be positioned in abutting or overlapping relation with one another. The web side edges 48 may be located at any position between the first and second bulb portion 32 such as along the first and second bulb portion 30, 32 as shown in the single bulb tadpole gasket 26 arrangement shown in FIG. 5. For the double bulb tadpole gasket 28 arrangement shown in FIG. 4, the web side edges 48 may be centrally located as shown in FIG. 4. A seam 50 may be located along each one of the first and second bulb portions 30, 32 to clamp the bulb core 36 within the bulb jacket 38 to prevent relative movement thereof.

The spacer rope 40 may be loosely positioned along the web interior surface 44 or the spacer rope 40 may be temporarily or permanently fastened to the web 42 by any suitable means including, but not limited to, adhesive bonding, mechanical attachment or any other means. However, temporary or permanent attachment of the spacer rope 40 to the web 42 may be generally unnecessary due to the capturing thereof within the web 42 when the second bulb portion 32 is wrapped around the spacer rope 40 and positioned in the gap $d_{bulb-rope}$ between the first bulb portion 30 and the spacer rope 40 when the gasket assembly 20 is in the folded configuration 24.

Referring still to FIGS. 3 and 4, for the double bulb tadpole gasket 28 arrangement, each one of the first and second bulb portions 30, 32 are interconnected by the web 42. The web 42 forms common tail portions 34 of the first and second bulb portions 30, 32. The web 42 may be fabricated of a material providing resilient resistance to bending in order to facilitate biasing or urging of the second bulb portion 32 into the groove 62 when the seal assembly 12 is in the folded configuration 24 in the tile gap 60 as shown in FIG. 7. Further in this regard, the web 42 may be fabricated of a material having a suitable web thickness $t_{web}$ and which may comprise one or a pair of overlapping layers as shown although the web 42 may be provided in any number of layers including a single layer of material interconnecting the first and second bulb portions 30, 32. It is also contemplated that the web 42 may be integrated with the spacer rope 40 such that the gasket assembly 20 and spacer rope 40 form a unitary structure. In such an arrangement (not shown), the integration and positioning of the spacer rope 40 along the web 42 may dictate the point about which the web 42 is bent into the folded configuration 24.

Figure 5:
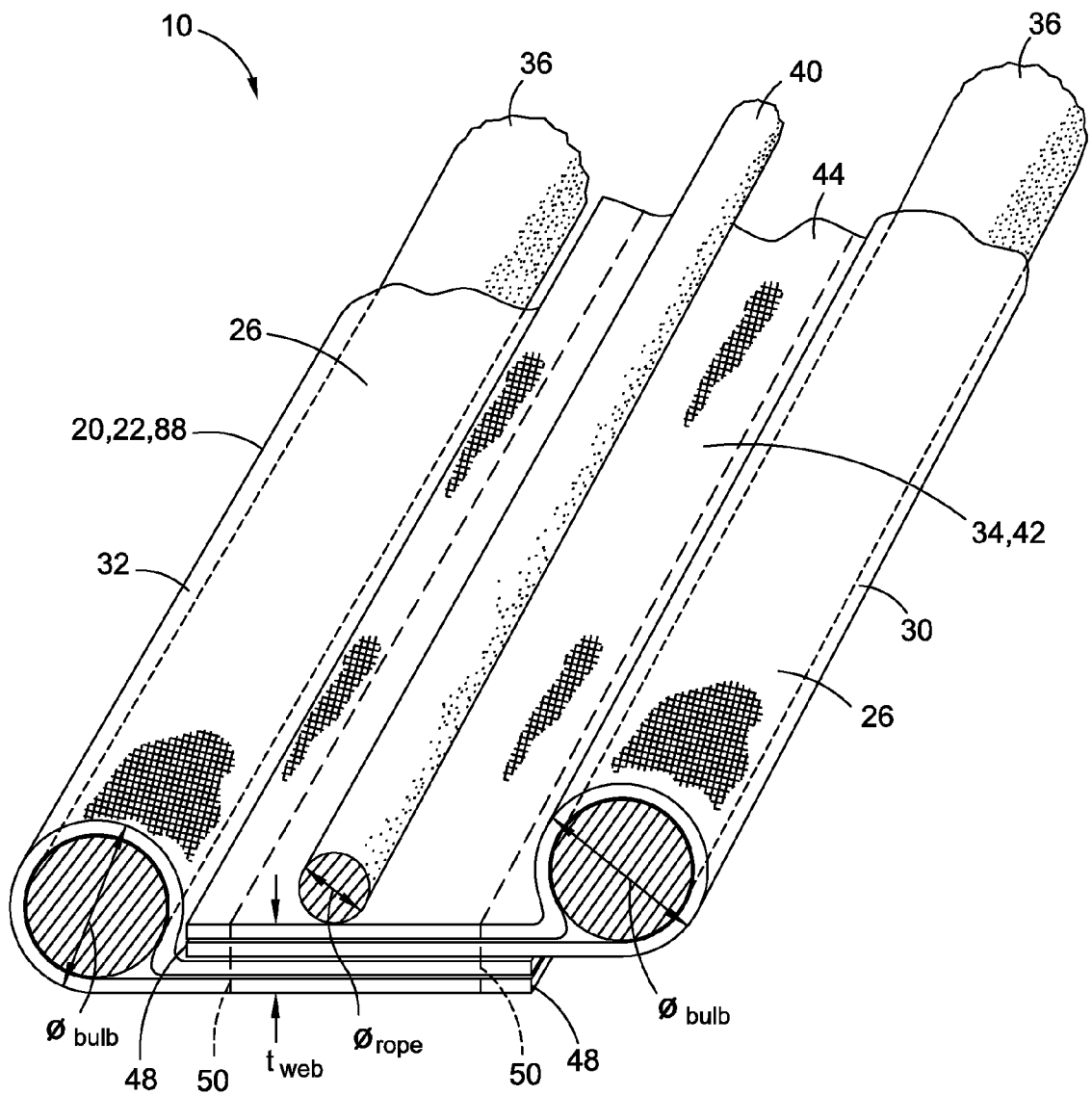
FIG. 5 is a perspective illustration of the gasket assembly comprising a pair of single bulb tadpole gasket configurations each having tail portions positioned in overlapping relation to one another.

Referring to FIG. 5, for the single bulb tadpole gasket 26 arrangement, each one of the first and second bulb portions 30, 32 has a tail portion 34. The tail portions 34 may be joined using one or more seams 50 running lengthwise such that the joined tail portions 34 collectively form the web 42. The tail portions 34 may be co-extensive with the bulb jacket 38 for each one of the first and second bulb portions 30, 32. As shown in FIG. 5, the web 42 (i.e., the overlapping tail portions 34) may comprise four layers of material which may result in a greater stiffness of the web 42 and a greater resistance of the web 42 to bending or folding as compared to the double bulb tadpole gasket 28 arrangement of FIGS. 3-4. By selecting the material composition and thickness $t_{web}$ of the web 42, the spring characteristics of the spring mechanism 88 of the gasket assembly 20 may be altered.

Although the web 42 is illustrated in FIGS. 4 and 5 as extending from a tangent of each one of the first and second bulb portions 30, 32, it is contemplated that the web 42 may be aligned with the centers of the each of the first and second bulb portions 30, 32. Furthermore, although the gasket configurations illustrated in FIGS. 4 and 5 are each illustrated as having seams 50 extending generally proximate to and along a length of the first and second bulb portions 30, 32, respectively, it is contemplated that the overlapping layers which make up the web thickness $t_{web}$ may be adhesively bonded to one another without the need for seams 50. Furthermore, although the web 42 is shown in a planar shape in FIGS. 3-4, it is also contemplated that the web 42 may be provided in a generally non-planar arrangement when the gasket assembly 20 is in the non-folded configuration 22. For example, it is contemplated that the gasket assembly 20 may be fabricated such that the web 42 is pre-folded or pre-formed into a U-shaped or V-shaped configuration but wherein the web 42 also provides resilient resistance to further bending or folding when inserted within the tile gap 60

Due to the resilient resistance provided by the web 42, the second bulb portion 32 may be biased away from the web interior surface 44 when the seal assembly 12 is mounted within the tile gap 60 as shown in FIG. 7 such that the second bulb portion 32 is disposed in non-contacting relation to the web interior surface 44. However, it is also contemplated that the second bulb portion 32 may be sized and configured such that the second bulb portion 32 is in contact with and is compressible against the web interior surface 44 when the seal assembly 12 is installed within the tile gap 60. It should also be noted that although the seal assembly 12 is illustrated as being installed within the tile gap 60 such that the first bulb portion 30 is positioned proximate the tile exterior surface 56, the seal assembly 12 may be oriented within the tile gap 60 such that the spacer rope 40 is positioned proximate the tile exterior surface 56 and the first bulb portion 30 is positioned on a side of the second bulb portion 32 opposite the first bulb portion 30. In such an orientation, the material of the first and second bulb portions 30, 32 and of the web 42 and spacer rope 40 may be selected to provide sufficient thermal protection for the substructure 78. In this regard, the spacer rope 40 may be formed of resiliently compressible material having low thermal conductivity. The seal assembly 12 may be configured such that the first and second bulb portions 30, 32 and spacer rope 40 maintain sealing engagement with the tile side surfaces 58 regardless of the contraction or the expansion of the tile gap 60 as a result of differences in thermal expansion between the substructure 78 and the tiles 52.

Referring to FIGS. 3-7, in regard to materials which may be used for constructing the seal assembly 12, the bulb core 36 of at least one of the first and second bulb portions 30, 32 may be fabricated of a low thermal conductivity material that is resiliently compressible at elevated temperatures. For example, the bulb core 36 may be fabricated of any suitable high temperature material including, but not limited to, silica, alumina-silica ceramic, fiberglass, silicone sponge or tubing and various combinations thereof. In this regard, the bulb core 36 may be fabricated of any suitable metallic and/or nonmetallic material which may have resilient compressive capabilities and which may have low thermal conductivity. In an embodiment, the bulb core 36 may be fabricated of alumina-silica material.

The bulb jacket 38 and/or web 42 may be formed of any suitable material providing sufficient stiffness or resilient resistance to bending or folding such that the gasket assembly 20 and spacer rope 40 result in the spring mechanism 88 to provide a spring-like quality to the seal assembly 12 in order to bias the second bulb portion 32 into the groove 62 as shown in FIG. 7. In this regard, the web 42 and/or bulb jackets 38 may be fabricated of any suitable woven or non-woven material having the capability to operate at high operating temperatures. For example, the web 42 and/or bulb jacket 38 may be fabricated of woven or non-woven ceramic fiber material such as Nextel 312 commercially-available from the 3M Company and which may be suitable for use up to approximately 3000° F. Preferably the material for the web 42 and bulb jacket 38 is of low thermal conductivity. In addition, the web 42 and/or bulb jackets 38 may be fabricated of other materials including, but not limited to, fiberglass and other woven or non-woven materials suitable for use in extreme environments without thermal degradation. The web 42 and/or bulb jackets 38 may be formed of a material have a stiffness sufficient to retain the seal assembly 12 within the tile gap 60 as a result of the spring mechanism 88 formed by the gasket assembly 20 and the spacer rope 40. Furthermore, it is contemplated that the web 42 and/or bulb jacket 38 may be fabricated of any metallic and/or nonmetallic material or combination thereof providing sufficient compressive resiliency and sealing functionality at temperature extremes.

The spacer rope 40 may be fabricated of any suitable material having compressive resilience and low thermal conductivity. For example, the spacer rope 40 may be fabricated of ceramic material such as braided silica rope. However, the spacer rope 40 may also be twisted, braided, knitted or provided in any other woven or non-woven configuration and formed of any suitable material including, but not limited to, ceramic materials or any other metallic and/or nonmetallic composition or combination thereof. The construction and materials for the spacer rope 40 may be selected in combination with the web 42 to provide sufficient resilience to bending or folding of the gasket assembly 20 to allow for generation of the biasing force to bias the second bulb portion 32 into the groove 62 as illustrated in FIG. 7. Although shown without a jacket, it is also contemplated that the spacer rope 40 may be formed as a bulb core 36 covered by a bulb jacket 38 similar to the construction of the first and second bulb portions 30, 32.

Referring to FIGS. 6-7, shown is an embodiment of the seal assembly 12 for sealing a tile gap 60 having a tile gap width $w_{gap}$ of one quarter of an inch and a tile gap height $h_{gap}$ of one inch, the first and second bulb portions 30, 32 may be provided with a bulb diameter $\emptyset_{bulb}$ of approximately one quarter of an inch and the spacer rope 40 may be provided in a rope diameter $\emptyset_{rope}$ of approximately one eighth of an inch as shown in FIG. 4. The inner surfaces of the opposing first and second bulb portions 30, 32 may have a spacing defined by $d_{bulb-bulb}$ of three quarters of an inch. The seal assembly 12 may be positioned in the folded configuration 24 as shown in FIGS. 6 and 7 such that the second bulb portion 32 may be placed between the spacer rope 40 and the first bulb portion 30 when the seal assembly 12 is installed in the tile gap 60. In such an arrangement, the first bulb portion 30 may be placed in sealing contact with the tile side surfaces 58 to form the first seal 14. Likewise, the groove 62 may be provided in a size that is compatible for receiving the second bulb portion 32. For example, the groove 62 may be provided with a height $h_{groove}$ of approximately three eighths of an inch and a depth $d_{groove}$ of approximately one eighth of an inch wherein an upper edge of the groove 62 may be positioned at a distance $d_{gap}$ from the tile exterior surface 56 of three eighths of an inch, such that the first bulb portion 30 is located proximate the tile exterior surface 56. In this configuration shown in FIG. 7, the inner gap 68 is defined by the distance from the seal assembly 12 to the substructure surface 80. The inner gap 68 prevents conduction of heat from the seal assembly 12 to the substructure 78.

The gasket assembly 20 and groove 62 may be configured such that an outermost surface of the first bulb portion 30 is positioned to be substantially flush with the tile exterior surface 56 although the first bulb portion 30 may be placed in non-flush relation with the tile exterior surface 56. As was indicated above, the tile exterior surface 56 may form the outer mold line 54 of a vehicle, an inner mold line of an engine nozzle or combustion chamber or a mold line of any other surface that may be exposed to hot convective flow. The groove 62 is preferably formed along a length of the tile side surface 58 as illustrated in FIGS. 6 and 7 such that the groove 62 is substantially parallel to the tile exterior surface 56. In this manner, the first bulb portion 30 may be positioned in substantially flush relationship with the tile exterior surface 56 along an array of tiles 52 mounted on the substructure 78. The seal assembly 12 having the above-noted dimensions may be placed in sealing engagement within the tile gap 60 having a tile gap width $w_{gap}$ of approximately one quarter of an inch and a tile gap height $h_{gap}$ of one inch for a gap width to gap height ratio of one to four. However, the seal assembly 12 may be configured to provide adequate sealing with tile gaps 60 of any size. As may be appreciated, sizing the seal assembly 12 and groove 62 in accordance with the tile gap width $w_{gap}$ and tile gap height $h_{gap}$ allows for a tight seal at the first seal 14 and second seal 16 as well as an adequate distance for the inner gap 68 thereby ensuring adequate thermal protection of substructure 78 below the tile gap 60. Sizing the seal assembly 12 in this manner may also provide a relatively smooth mold line at the tile gap 60 which may minimize or reduce aerodynamic pressure losses in flow passing over the tile gap 60.

In an embodiment, the seal assembly 12 may be configured to provide thermal protection for underlying substructure 78 for tile gaps 60 ranging in size between approximately 0.01 inches up to approximately 0.50 inches although the seal assembly 12 may be sized and configured to provide sealing of tile gaps 60 of any size. Regardless of the specific dimensions of the tile gap 60, the seal assembly 12 is preferably sized and configured such that the gasket assembly 20 and spacer rope 40 form the spring mechanism which biases the second bulb portion 32 into the groove 62 for locking the seal assembly 12 within the tile gap 60. In addition, the seal assembly 12 is preferably sized and configured to fit within the tile gap 60 in a manner resulting in the formation of the inner gap 68 between the seal assembly 12 and the substructure surface 80. Depending upon the particular configuration of the gasket assembly 20 (i.e., double bulb tadpole gasket 28 or single bulb tadpole gasket 26), an interference fit of the seal assembly 12 may be generated within the tile gap 60 wherein the web exterior surface 46 and the bulb jackets 38 are in sealing contact with the tile side surfaces 58 when the gasket assembly 20 is in the folded configuration 24 in the tile gap 60.

Figure 8:
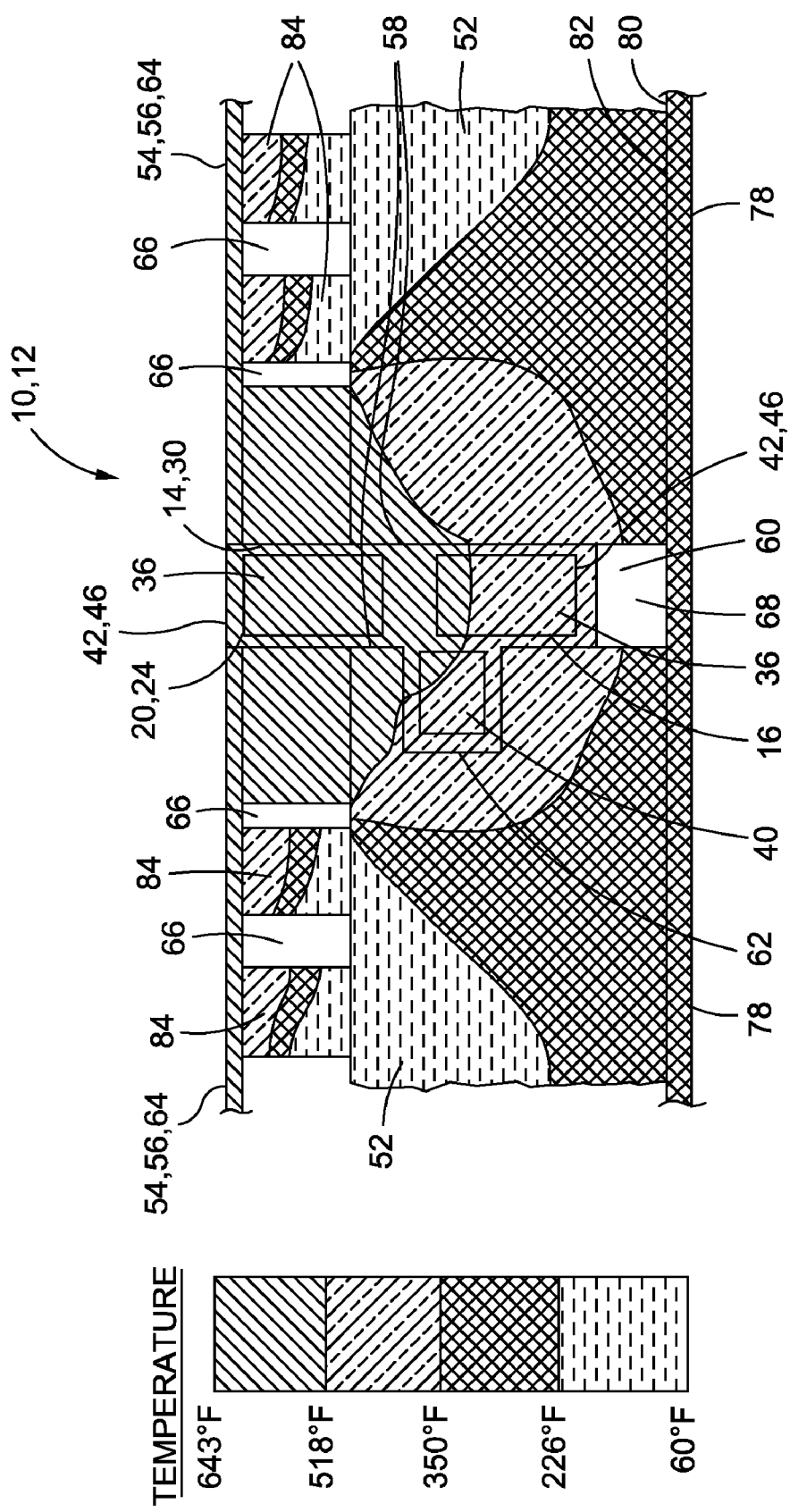
FIG. 8 is a heat transfer analysis model of the seal assembly installed within the tile gap formed between a pair of actively-cooled tiles and illustrating a temperature distribution through the heat transfer analysis model.

Referring to FIG. 8, shown is the result of a thermal analysis of the seal assembly 12 as installed between a pair of thermal tiles 52 having an erosion coating 64 on the tile exterior surface 56. The thermal analysis illustrates the ability of the seal assembly 12 to thermally protect the underlying aluminum substructure 78 from a representative convective heat flux resulting from gas at a temperature of 814° F. flowing over the tile exterior surface 56 and over an exposed portion of the seal assembly 12. The heat transfer analysis models the tiles 52 as actively-cooled foam tiles having coolant circulating through channels 66 bounded by strips 84.

The heat transfer analysis model in FIG. 8 illustrates the temperature distribution through the tiles 52, seal assembly 12 and aluminum substructure 78 under the influence of the convective heat flux. More particularly, FIG. 8 illustrates that the seal assembly 12 limits the temperature increase in the substructure 78 located beneath the seal assembly 12 to 7° F. above the temperature of the aluminum substructure 78 adjacent to the tile gap 60. Furthermore, FIG. 8 illustrates that the maximum aluminum substructure 78 temperature may be limited to 247° F. which is below the 350° F. maximum allowable temperature for aluminum. The thermal analysis indicates that the seal assembly 12 configuration provides an adequate thermal barrier for the substructure 78 against extreme temperature environments.

Figure 9:
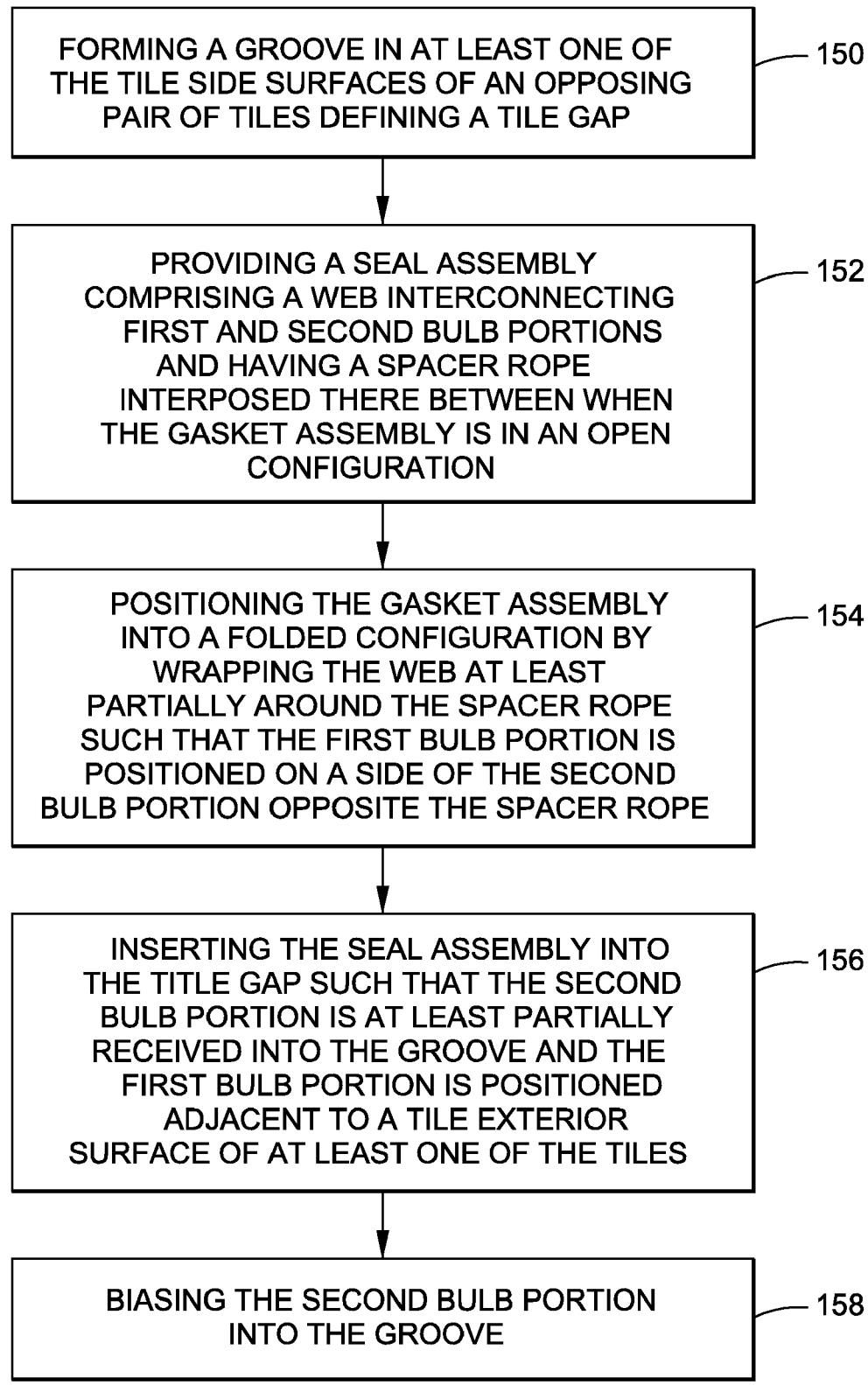
FIG. 9 is a flow chart representing a methodology of sealing the tile gap.

Referring to FIG. 9, shown is a methodology for sealing a tile gap 60 between a pair of tiles 52 using a seal assembly 12 as described above and illustrated in FIGS. 1-7. The methodology may be performed in the context of a pair of tiles 52 of which at least one has a tile side surface 58 with a groove 62 formed therein in Step 150. Step 152 may comprise providing the seal assembly 12 including the web 42 which interconnects the first and second bulb portions 30, 32. As was indicated above, the seal assembly 12 may include the spacer rope 40 which is interposed between the first and second bulb portions 30, 32 when the gasket assembly 20 is in the open configuration 22 as illustrated in FIGS. 3-5. Step 154 may include positioning the gasket assembly 20 into the folded configuration 24 as illustrated in FIGS. 6 and 7 to facilitate installation of the seal assembly 12 within the tile gap 60. In this regard, the gasket assembly 20 may be moved into the folded configuration 24 by encircling or at least partially wrapping the web 42 around at least a portion of the spacer rope 40 such that the second bulb portion 32 is positioned between the first bulb portion 30 and the spacer rope 40.

The first bulb portion 30 may be positionable in sealing engagement with both of the tile side surfaces 58 in order to form the first seal 14 as illustrated in FIG. 7. Upon insertion of the seal assembly 12 into the tile gap 60 in Step 156, the second bulb portion 32 may be at least partially received into the groove 62 under the biasing force of the web 42. In Step 158, the second bulb portion 32 may be biased away from the web 42 and into the groove 62 in order to lock or secure the second bulb portion 32 into the groove 62 and prevent extraction of the seal assembly 12 from the tile gap 60. When installed such that the second bulb portion 32 is received within the groove 62, the first bulb portion 30 may be located proximate the tile exterior surface 56. More specifically, the first bulb portion 30 may be sized and configured to provide sealing engagement with the tile side surface 58 and may be substantially flush with the tile exterior surface 56 to provide continuity with the outer mold line 54.

The second bulb portion 32 and spacer rope 40 are preferably configured to maintain sealing engagement with the groove 62 and an opposing one of the tile side surfaces 58 to form the second seal 16 in the tile gap 60. In this regard, the first and second seals 14, 16 cooperate to provide redundant thermal protection against hot convective flow into the tile gap 60 which may otherwise reach the substructure 78. To prevent removal of the seal assembly 12 from the tile gap 60, the second bulb portion 32 and the spacer rope 40 are preferably sized and configured to prevent movement or passage of the spacer rope 40 between the second bulb portion 32 and the tile side surface 58 opposite the second bulb portion 32. The spacer rope 40 may be configured such that upward movement of the spacer rope 40 increases sealing engagement with the tile gap 60. In addition, the seal assembly 12 is positioned such that the inner gap 68 is formed between the seal assembly 12 and the substructure surface 80.

Figure 10:
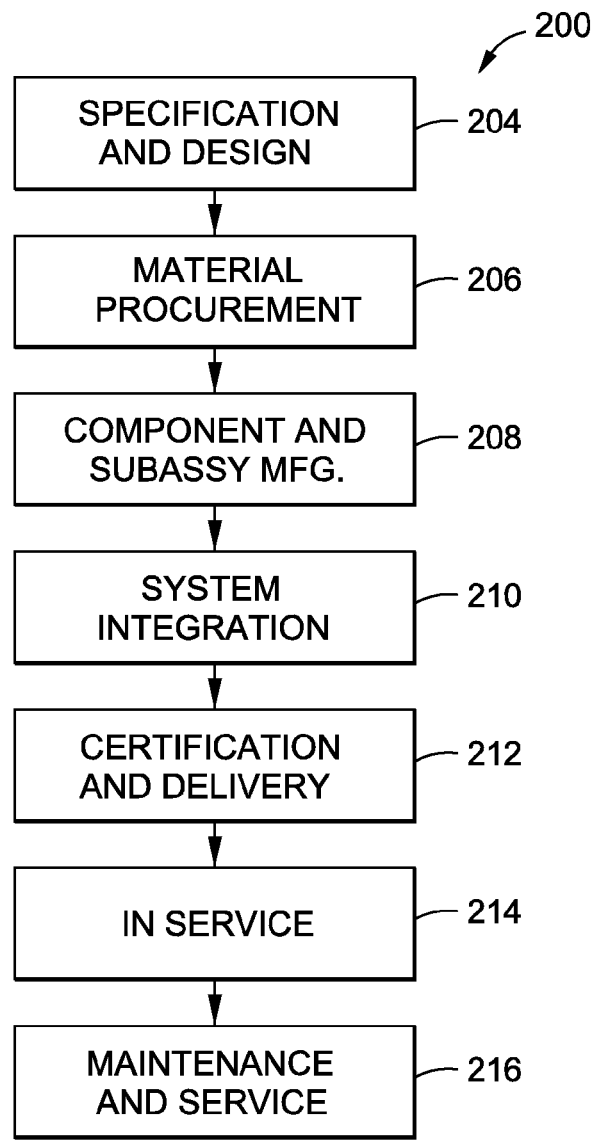
FIG. 10 is a flow diagram of an aircraft production and service methodology.
Figure 11:
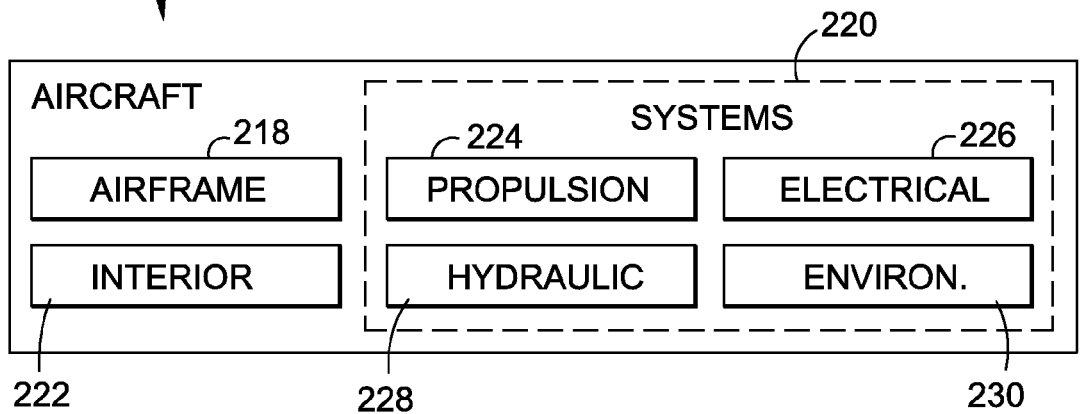
FIG. 11 is a block diagram of an aircraft.

Referring to FIGS. 10-11, embodiments of the disclosure may be described in the context of an aircraft manufacturing and service method 200 as shown in FIG. 10 and an aircraft 202 as shown in FIG. 11. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the disclosed embodiments may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A seal assembly for sealing a tile gap defined by an opposing pair of tile side surfaces, at least one of the tile side surfaces having a groove formed along a length thereof, the seal assembly comprising:
    a gasket assembly including first and second bulb portions interconnected by a web; and
    a spacer rope positionable along the web;
    wherein:
        the web is configured to at least partially encircle the spacer rope;
        the second bulb portion being at least partially receivable within the groove;
        the spacer rope and the first bulb portion being located outside of the groove when the seal assembly is mounted in the tile gap in sealing engagement with the tile side surfaces.

2. The seal assembly of claim 1 wherein:
    the gasket assembly defines an open configuration when the spacer rope is positioned between the first and second bulb portions;
    the gasket assembly defining a folded configuration for mounting in the tile gap when the web at least partially encircles the spacer rope;
    the gasket assembly being movable from the open configuration to the folded configuration for mounting in the tile gap.

3. The seal assembly of claim 2 wherein:
    the web is resiliently resistant to wrapping around the spacer rope when the gasket assembly is in the folded configuration such that the gasket assembly and the spacer rope form a spring mechanism;
    the spring mechanism biasing the second bulb portion into the groove when the seal assembly is mounted in the tile gap.

4. The seal assembly of claim 1 wherein:
    the second bulb portion and the spacer rope are sized to prevent movement of the spacer rope past the second bulb portion when the seal assembly is mounted in the tile gap.

5. The seal assembly of claim 1 wherein:
    the tile gap is at least partially bounded by a substructure having a substructure surface;
    the gasket assembly being positionable within the tile gap in spaced relation to the substructure surface such that an inner gap is formed between the gasket assembly and the substructure surface.

6. The seal assembly of claim 1 wherein:
    at least one of the first and second bulb portions is comprised of a bulb core at least partially encircled by a bulb jacket.

7. The seal assembly of claim 6 wherein:
the bulb core, bulb jacket and web have a ceramic composition.

8. The seal assembly of claim 1 wherein:
the spacer rope has a silica composition.

9. A seal assembly for sealing a tile gap defined by opposing tile side surfaces of a corresponding pair of tiles, at least one of the tile side surfaces having a groove formed along a length thereof, the seal assembly comprising:
a gasket assembly, including:
first and second bulb portions interconnected by a web; and
a spacer rope interposed between the first and second bulb portions when the gasket assembly is in an open configuration;
wherein:
the gasket assembly defines a folded configuration when the web is at least partially wrapped around the spacer rope;
the web being resiliently resistant to wrapping around the spacer rope when the gasket assembly is in the folded configuration such that the gasket assembly and the spacer rope form a spring mechanism;
the second bulb portion being at least partially receivable within the groove;
the spacer rope and the first bulb portion being located outside of the groove when the seal assembly is mounted in the tile gap in sealing engagement with the tile side surfaces.

10. The seal assembly of claim 9 wherein:
the gasket assembly is movable from the open configuration to the folded configuration for mounting in the tile gap.

11. A seal assembly for sealing a tile gap defined by opposing tile side surfaces of a corresponding pair of tiles, at least one of the tile side surfaces having a tile exterior surface and a groove formed along a length thereof, the seal assembly comprising:
a gasket assembly, including:
first and second bulb portions interconnected by a web; and
a spacer rope interposed between the first and second bulb portions when the gasket assembly is in an open configuration;
wherein:
the gasket assembly defines a folded configuration when the web is at least partially wrapped around the spacer rope;
the web being resiliently resistant to wrapping around the spacer rope when the gasket assembly is in the folded configuration such that the gasket assembly and the spacer rope form a spring mechanism;
the gasket assembly being oriented in the tile gap such that the first bulb portion is positioned proximate the tile exterior surface.

12. A sealing system for sealing a tile gap defined by opposing tile side surfaces of a pair of tiles, comprising:
a groove formed along a length of at least one of the tile side surfaces;
a seal assembly including:
a gasket assembly having first and second bulb portions interconnected by a web; and
a spacer rope positionable along the web;
wherein:
the gasket assembly defines a folded configuration for mounting within the tile gap when the web at least partially encircles the spacer rope such that the second bulb portion is positioned between the spacer rope and the first bulb portion;
the second bulb portion being at least partially receivable within the groove.

13. The sealing system of claim 12 wherein:
the web is resiliently resistant to wrapping around the spacer rope when the gasket assembly is in the folded configuration such that the gasket assembly and the spacer rope form a spring mechanism, the spring mechanism biasing the second bulb portion into the groove when the seal assembly is mounted in the tile gap.

14. The sealing system of claim 12 wherein:
at least one of the tiles has a tile exterior surface;
the gasket assembly being oriented in the tile gap such that the first bulb portion is positioned proximate the tile exterior surface.

15. The sealing system of claim 14 wherein:
the groove is oriented in substantially parallel relation to the tile exterior surface.

16. A vehicle, comprising:
at least two tiles defining a tile gap therebetween, at least one of the tiles having a tile side surface with a groove formed therein; and
a seal assembly, including:
a gasket assembly having first and second bulb portions interconnected by a web; and
a spacer rope having the web wrapped partially therearound such that the second bulb portion is positioned between the first bulb portion and the spacer rope when the gasket assembly is in a folded configuration;
wherein:
the second bulb portion is receivable within the groove when the seal assembly is mounted within the tile gap.

17. The vehicle of claim 16 wherein:
the gasket assembly defines an open configuration when the spacer rope is positioned between the first and second bulb portions;
the gasket assembly being movable from the open configuration to the folded configuration for mounting in the tile gap.

18. The vehicle of claim 16 wherein:
the web being resiliently resistant to wrapping around the spacer rope when the gasket assembly is in the folded configuration such that the gasket assembly and the spacer rope form a spring mechanism, the spring mechanism biasing the second bulb portion into the groove when the seal assembly is mounted in the tile gap.

19. The vehicle of claim 16 wherein:
at least one of the tiles having a tile exterior surface;
the gasket assembly being oriented in the tile gap such that the first bulb portion is positioned proximate the tile exterior surface.

20. A method of sealing a tile gap defined by a pair of tile side surfaces, at least one of the tile side surfaces having a groove formed along a length thereof, the method comprising the steps of:
providing a seal assembly having a gasket assembly including a web interconnecting first and second bulb portions and having a spacer rope disposed along the web;
inserting the seal assembly into the tile gap with the gasket assembly in a folded configuration such that the second bulb portion is at least partially received within the groove and the spacer rope and the first bulb portion are positioned on opposite sides of the second bulb portion.

21. The method of claim 20 further comprising the step of:
biasing the second bulb portion into the groove.

22. The method of claim 20 further comprising the step of:
orienting the seal assembly within the tile gap such that the first bulb portion is positioned proximate the tile exterior surface.

23. The method of claim 20 wherein the tile gap is at least partially bounded by a substructure having a substructure surface, the method further comprising the step of:
forming an inner gap between the seal assembly and the substructure surface.

24. A method of sealing a tile gap between opposing tile side surfaces of a corresponding pair of tiles, the method comprising the steps of:
forming a groove in at least one of the tile side surfaces;
providing a seal assembly comprising a web interconnecting first and second bulb portions and having a spacer rope interposed therebetween when the gasket assembly is in an open configuration;
positioning the gasket assembly into a folded configuration by wrapping the web at least partially around the spacer rope such that the first bulb portion is positioned on a side of the second bulb portion opposite the spacer rope; and
inserting the seal assembly into the tile gap such that the second bulb portion is at least partially received into the groove and the first bulb portion is positioned adjacent to a tile exterior surface of at least one of the tiles.

25. The method of claim 24 further comprising the step of:
biasing the second bulb portion into the groove.

* * * * *